US009580257B2

(12) United States Patent
Varga

(10) Patent No.: US 9,580,257 B2
(45) Date of Patent: Feb. 28, 2017

(54) HOT MELT ADHESIVE SUPPLY HAVING AGITATION DEVICE, AND RELATED METHODS

(71) Applicant: Nordson Corporation, Westlake, OH (US)

(72) Inventor: Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 258 days.

(21) Appl. No.: 14/464,967

(22) Filed: Aug. 21, 2014

(65) Prior Publication Data

US 2015/0063925 A1 Mar. 5, 2015

Related U.S. Application Data

(60) Provisional application No. 61/873,522, filed on Sep. 4, 2013.

(51) Int. Cl.
| | |
|---|---|
| *B65G 53/58* | (2006.01) |
| *B65G 53/56* | (2006.01) |
| *B65G 53/36* | (2006.01) |
| *B05C 11/10* | (2006.01) |
| *B05B 7/14* | (2006.01) |
| *B05B 15/00* | (2006.01) |

(52) U.S. Cl.
CPC ............ *B65G 53/56* (2013.01); *B05B 7/1468* (2013.01); *B05C 11/101* (2013.01); *B05C 11/1042* (2013.01); *B05C 11/1047* (2013.01); *B65G 53/36* (2013.01); *B05B 7/1409* (2013.01); *B05B 15/002* (2013.01)

(58) Field of Classification Search
CPC . B05B 7/1468; B05C 11/101; B05C 11/1042; B05C 11/1047
USPC .................................................. 406/106, 139
See application file for complete search history.

(56) References Cited

U.S. PATENT DOCUMENTS

| | | | | |
|---|---|---|---|---|
| 2,687,331 | A | * | 8/1954 | Seaman .................. E04F 21/12 406/146 |
| 2,744,792 | A | | 5/1956 | Finn |
| 2,774,792 | A | | 5/1956 | Finn |
| 2,955,880 | A | | 10/1960 | Albers |
| 3,030,153 | A | | 4/1962 | Krenke et al. |
| 3,186,768 | A | | 6/1965 | Pendelton |

(Continued)

FOREIGN PATENT DOCUMENTS

| | | |
|---|---|---|
| DE | 3543485 A1 | 6/1987 |
| EP | 1044904 A1 | 10/2000 |

(Continued)

OTHER PUBLICATIONS

U.S. Patent and Trademark Office, Office Action in U.S. Appl. No. 13/796,515, May 7, 2015.

(Continued)

*Primary Examiner* — William R Harp
(74) *Attorney, Agent, or Firm* — Baker & Hostetler LLP

(57) ABSTRACT

A hot melt adhesive supply system includes a container configured to receive a supply of unmelted hot melt adhesive pieces, and an agitation device configured to agitate the supply of hot melt adhesive pieces situated in the container. The hot melt adhesive supply system further includes a transfer conduit configured to communicate hot melt adhesive pieces from the container to a hot melt adhesive melter.

20 Claims, 3 Drawing Sheets

(56) References Cited

U.S. PATENT DOCUMENTS

| | | | |
|---|---|---|---|
| 3,476,570 A | 11/1969 | McIntosh | |
| 3,580,644 A | 5/1971 | Ballard | |
| 4,273,477 A | 6/1981 | Murphy | |
| 4,500,038 A * | 2/1985 | De Ferrari | B05B 7/1404 |
| | | | 118/312 |
| 4,505,623 A | 3/1985 | Mulder | |
| 4,583,885 A | 4/1986 | Thiele | |
| 4,659,293 A | 4/1987 | Evenson | |
| 4,722,267 A | 2/1988 | Galockin et al. | |
| RE32,841 E | 1/1989 | Mulder | |
| 4,893,758 A | 1/1990 | Foley et al. | |
| 4,919,072 A | 4/1990 | Claasen | |
| 5,006,018 A | 4/1991 | Depew | |
| 5,006,019 A | 4/1991 | Dziedzic, Jr. et al. | |
| 5,028,224 A * | 7/1991 | Pieper | A61F 13/15577 |
| | | | 19/304 |
| 5,269,463 A | 12/1993 | Burks | |
| 5,378,089 A | 1/1995 | Law | |
| 5,382,117 A | 1/1995 | Rings et al. | |
| 5,406,777 A | 4/1995 | Porto | |
| 5,518,344 A | 5/1996 | Miller et al. | |
| 5,690,450 A | 11/1997 | Miller et al. | |
| 5,791,830 A | 8/1998 | Fort et al. | |
| 5,909,829 A | 6/1999 | Wegman et al. | |
| 5,971,207 A | 10/1999 | McDonough et al. | |
| 6,039,513 A | 3/2000 | Law | |
| 6,056,483 A | 5/2000 | Nakamura et al. | |
| 6,095,803 A | 8/2000 | Slater | |
| 6,138,724 A * | 10/2000 | Rivera | B67D 7/02 |
| | | | 141/104 |
| 6,352,173 B1 | 3/2002 | Duckworth | |
| 6,398,462 B1 | 6/2002 | Fulkerson | |
| 6,740,851 B2 | 5/2004 | Woodlief et al. | |
| 7,490,735 B2 | 2/2009 | Raines et al. | |
| 7,626,143 B2 | 12/2009 | Miller | |
| 7,871,090 B2 | 1/2011 | Staub | |
| 8,240,494 B1 | 8/2012 | Mohns | |
| 8,307,861 B2 | 11/2012 | Jordan et al. | |
| 8,383,991 B2 | 2/2013 | Ganzer et al. | |
| 8,529,160 B2 | 9/2013 | Ambriz | |
| 8,985,391 B2 * | 3/2015 | Ross | B29B 13/022 |
| | | | 222/1 |
| 2001/0009752 A1 | 7/2001 | Reifenberger et al. | |
| 2005/0093403 A1 | 5/2005 | Raterman et al. | |
| 2005/0264141 A1 | 12/2005 | Whitall | |
| 2005/0274740 A1 | 12/2005 | Duckworth et al. | |
| 2007/0080157 A1 | 4/2007 | Mehaffy et al. | |
| 2009/0095730 A1 | 4/2009 | Ganzer et al. | |
| 2012/0177451 A1 | 7/2012 | Kvalheim | |
| 2012/0312838 A1 | 12/2012 | Clark et al. | |
| 2013/0105526 A1 | 5/2013 | Ross et al. | |
| 2014/0119842 A1 | 5/2014 | Jeter | |

FOREIGN PATENT DOCUMENTS

| | | |
|---|---|---|
| EP | 1153668 A2 | 11/2001 |
| EP | 1350743 B1 | 6/2006 |
| FR | 2787770 A1 | 6/2000 |
| JP | 59177154 | 10/1984 |

OTHER PUBLICATIONS

European Patent Office, European Search Report in EP Application No. 14183120, Apr. 30, 2015.

Melton SE, B42 Series Systems PUR Adhesive Melters 42L, Brochure, dated before Sep. 4, 2013.

Nordson Corporation, Fillmaster™ Adhesive Feed System, PLK-02-2833, Sep. 2002, 2 pgs.

National Starch & Chemical, Installation, Operation & Maintenance Manual 3D Melt Tank Loader, 3D Vacuum Feed System Unit—Loan Terms, Version 1.3, dated before Sep. 4, 2013, 22 pgs.

WBH Technologies e.K, Einbauhinweise Fördersystem Slimline auf Nordson 3100, dated before Sep. 4, 2013, 2 pgs.

WBH Technologies e.K., Operating Manual Conveyor System Slimline, Jul. 2009, 8 pgs.

Nordson Corporation, Pneumatic Fill System Instruction Sheet, Publication No. 108 805A, 1994, 27 pgs.

Nordson Corporation, Adhesives and Sealants Equipment Guide, Vacuum Feed System, Publication No. 237 481C, 2001, 12 pgs.

Nordson Corporation, 1994 Adhesives and Sealants Equipment Catalog, Nordson Automatic Hopper/Feeder, 1994, 5 pgs.

Nordson Corporation, 1994 Adhesives and Sealants Equipment Catalog, Nordson Meltex XP Extruder, 1994, 4 pgs.

Nordson Corporation, 1996 Adhesives and Sealants Equipment Catalog, Nordson Vacuum Feed System, 1996, 7 pgs.

European Patent Office, European Search Report in EP Application No. 13187635, Mar. 4, 2014.

* cited by examiner

HOT MELT ADHESIVE SUPPLY HAVING AGITATION DEVICE, AND RELATED METHODS

CROSS-REFERENCE TO RELATED APPLICATION

This application claims the priority of U.S. Provisional Patent Application Ser. No. 61/873,522, filed on Sep. 4, 2013 (pending), the disclosure of which is incorporated by reference herein.

FIELD OF THE INVENTION

The present invention generally relates to hot melt adhesive systems, and more particularly to systems for supplying hot melt adhesive melters with unmelted hot melt adhesive pieces.

BACKGROUND

Hot melt adhesive systems have many applications in manufacturing and packaging. For example, thermoplastic hot melt adhesives are used for carton sealing, case sealing, tray forming, pallet stabilization, nonwoven applications including diaper manufacturing, and many other applications. Hot melt adhesives often come in the form of pellets or particulates, which are generally referred to as pieces, and are contained in or provided from an adhesive supply, such as a tank or hopper. The hot melt adhesive pieces can be heated and melted by a melter, and liquified hot melt adhesive can be pumped to a dispenser, such as a dispensing gun or other applicator which applies the hot melt adhesive to a substrate. Hot melt adhesive, in its pre-melted state (referred to herein as hot melt adhesive pieces, or unmelted hot melt adhesive pieces), can be provided in a variety of shapes and sizes, ranging from small bb-sized pieces, to larger sized pieces which are sometimes referred to as "chips" and still larger "pillows" that are several inches in dimension. Hot melt adhesive pieces may be moved from the adhesive supply to the melter as part of an automated filling operation.

For example, air-driven, or pneumatic, transfer systems use the force of flowing air to move hot melt adhesive pieces from an adhesive supply to a melter. In a known arrangement, a transfer conduit connects the adhesive supply with the melter, and an air pump is operated to generate an air flow that moves hot melt adhesive pieces through the transfer hose from the adhesive supply to the melter.

Environmental conditions, however, can interfere with the movement of hot melt adhesive pieces from the adhesive supply to the melter. In particular, temperature and/or the amount of time that the hot melt adhesive pieces have been in the adhesive supply may affect the movement of the hot melt adhesive pieces. For example, as the environmental temperature increases, the hot melt adhesive pieces can begin to soften and stick together to form clumps of hot melt adhesive.

Pneumatic transfer systems have a limit relative to the size and weight of the hot melt adhesive that they can transfer in a cost effective manner. Large clumps of hot melt adhesive can be too large to fit through a transfer hose and travel between the adhesive supply and the melter. Large clumps can also be too heavy to be moved by a given pneumatic transfer system. If a melter is not provided with an appropriate flow of hot melt adhesive pieces, the melter will not be able to provide liquid hot melt adhesive to a dispenser. This would cause an undesirable disruption of a dispensing operation.

In addition, as hot melt adhesive pieces begin to stick together in the adhesive supply, features can be formed in the adhesive supply that also tend to deprive an adhesive melter with an appropriate flow of hot melt adhesive pieces. For example, hot melt adhesive pieces that have stuck together can create a clump or an even larger formation in the adhesive supply. Such a formation will not be moved out of the adhesive supply by the pneumatic transfer system. In addition, the formation is likely to block the flow of hot melt adhesive pieces from the adhesive supply to the transfer conduit that connects the adhesive supply with the melter. Moreover, clumps or large formations of hot melt adhesive tend to cause nearby hot melt adhesive pieces to stick to them, and this process can lead to substantially large formations in the adhesive supply.

In addition to increased temperatures, the amount of time that hot melt adhesive pieces have been sitting still in an adhesive supply can also cause problems for moving the hot melt adhesive pieces to a melter. The longer hot melt adhesive pieces sit in the adhesive supply, they can begin to stick together, leading to similar problems as those discussed above.

There is a need, therefore, for adhesive supply systems that address one or more of the drawbacks discussed above.

SUMMARY

According to one embodiment of the invention, a hot melt adhesive supply system includes a container configured to receive a supply of unmelted hot melt adhesive pieces, and an agitation device configured to agitate the supply of hot melt adhesive pieces situated in the container. The hot melt adhesive supply system further includes a transfer conduit configured to communicate hot melt adhesive pieces from the container to a hot melt adhesive melter.

According to another embodiment of the invention, a method is provided for supplying unmelted hot melt adhesive pieces to a hot melt adhesive melter. The method includes agitating a supply of hot melt adhesive pieces.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
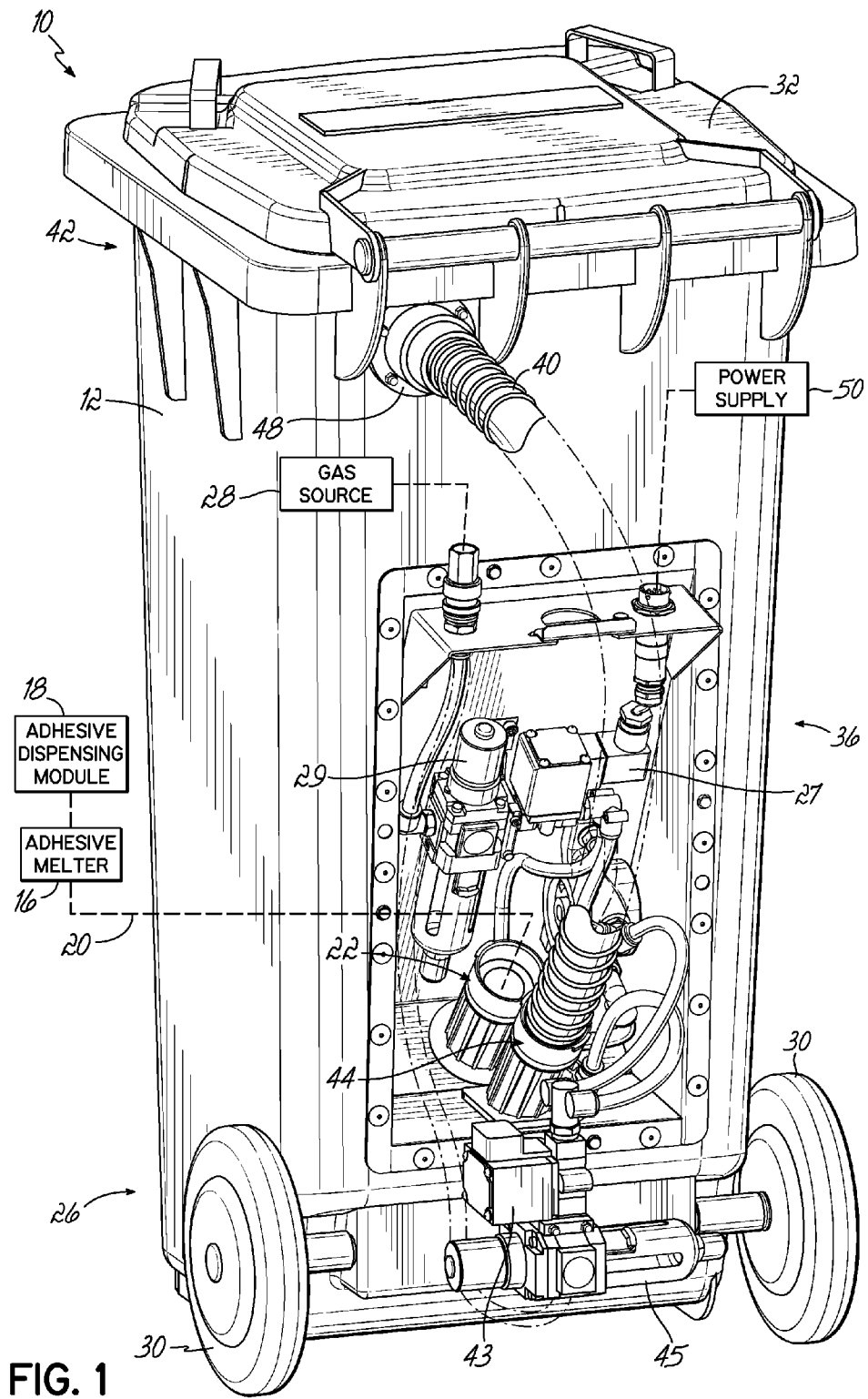
FIG. 1 is an isometric view schematically depicting features of a hot melt adhesive supply system according to an embodiment of the invention.
Figure 2:
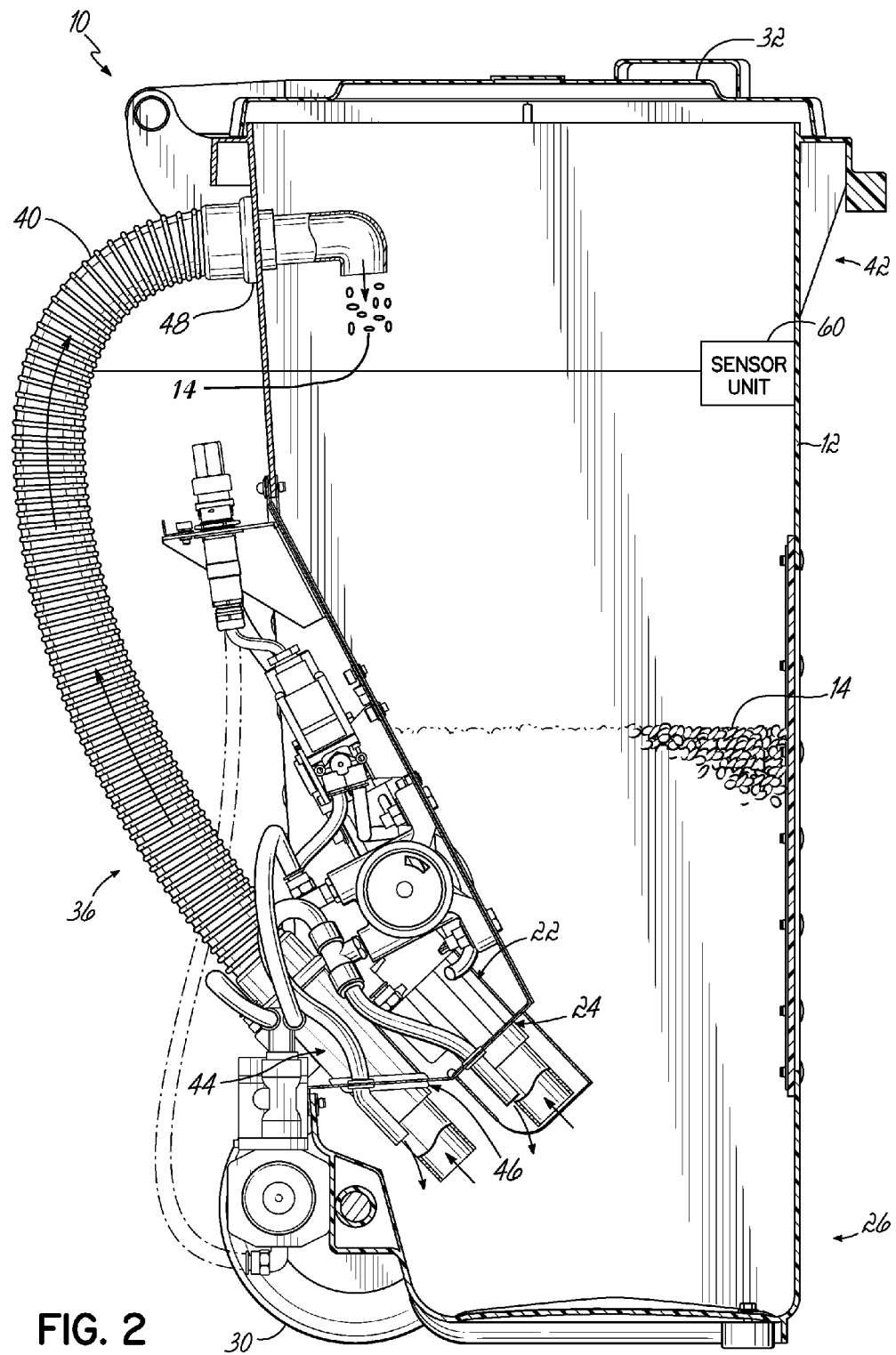
FIG. 2 is a side elevational view in partial cross section of the hot melt adhesive supply system of FIG. 1.

Referring to the figures, and beginning with FIGS. 1 and 2, an exemplary hot melt adhesive supply system 10 includes a container 12 that is configured to receive a supply of unmelted hot melt adhesive pieces 14. The system 10 is configured to supply hot melt adhesive pieces 14 to an adhesive melter 16, which in turn is configured to provide melted liquid hot melt adhesive to an adhesive dispensing module 18. In particular, a transfer conduit 20 is coupled with the container 12 and is configured to communicate hot melt adhesive pieces 14 from the container 12 to the adhesive melter 16.

A first pump 22 is operatively coupled with the transfer conduit 20 and is configured for moving hot melt adhesive pieces 14 in the transfer conduit 20 from the container 12 toward the adhesive melter 16. In particular, the first pump 22 uses the force of flowing air to move the hot melt adhesive pieces 14. The container 12 has a transfer outlet 24 that is configured to communicate hot melt adhesive pieces 14 out of the container 12 and into the transfer conduit 20. In the embodiment shown, the transfer conduit 20 is received in the transfer outlet 24. The transfer outlet 24 is generally positioned in a bottom region 26 of the container 12 adjacent the bottom thereof, so as to provide access between the hot melt adhesive pieces 14 in the container 12 and the transfer conduit 20. In the embodiment shown, the first pump 22 is a venturi-type pump, which uses a gas source 28 to create pumping forces for moving the hot melt adhesive pieces 14. For example, the gas source 28 can be shop air.

The container 12 may be a relatively portable unit that includes wheels 30 and a lid 32, but it will be appreciated that other types of containers could also be used.

The system 10 also includes an agitation device that is configured to agitate the supply of hot melt adhesive pieces 14 in the container 12. In the embodiment shown, the agitation device is a recirculation device 36. The recirculation device 36 is configured to move hot melt adhesive pieces 14 from one region of the container 12 to another.

In particular, and as shown in this embodiment, a recirculation conduit 40 extends between the bottom region 26 and a top region 42 of the container 12, the top region 42 being adjacent a top of the container 12 near the position of the lid 32. A second pump 44 is operatively coupled with the recirculation conduit 40 and is configured for moving hot melt adhesive pieces 14 in the recirculation conduit 40 between the bottom region 26 and the top region 42. The pump 44 uses the force of flowing air to move the hot melt adhesive pieces 14.

The container 12 has a recirculation outlet 46 that is configured to communicate hot melt adhesive pieces 14 out of the container 12 and into the recirculation conduit 40. In the embodiment shown, the recirculation conduit 40 is received in the recirculation outlet 46. The recirculation outlet 46 is generally positioned in the bottom region 26 of the container 12, so as to provide access between the hot melt adhesive pieces 14 in the container 12 and the recirculation conduit 40. In the embodiment shown, the second pump 44 is also a venturi-type pump, which uses the gas source 28 to create pumping forces for moving the hot melt adhesive pieces 14.

The transfer outlet 24 and the recirculation outlet 46 are generally adjacent one another, but other configurations are also possible. Moreover, in the embodiment shown, the transfer outlet 24 is positioned generally above the recirculation outlet 46 in the container 12. Thereby, the recirculation outlet 46 is positioned generally below the transfer outlet 24 in the container 12.

The container 12 also includes a recirculation inlet 48 that is configured to communicate hot melt adhesive pieces 14 out of the recirculation conduit 40 and back into the container 12. The recirculation inlet 48 is positioned in the top region 42 of the container 12, and the recirculation conduit 40 is received in the recirculation inlet 48. Thereby, the recirculation conduit 40 extends between the recirculation outlet 46 and the recirculation inlet 48. Optionally, a diffuser can be coupled with the recirculation conduit 40 to diffuse the hot melt adhesive pieces 14 that are moved in the conduit 40 to the top region 42. In particular, the diffuser can diffuse the hot melt adhesive pieces 14 exiting the recirculation conduit 40 and re-entering the container 12.

A power supply 50 provides power to all components of the system 10. In use, the system 10 agitates hot melt adhesive pieces 14 in the container 12 and directs hot melt adhesive pieces 14 from the container 12 to the adhesive melter 16. In particular, the recirculation device 36 is an agitation device that agitates hot melt adhesive pieces 14 by moving hot melt adhesive pieces 14 from the bottom region 26 to the top region 42 of the container 12. The pumps 22, 44 move hot melt adhesive pieces 14 in the transfer conduit 20 and the recirculation conduit 40, respectively. And, hot melt adhesive pieces 14 are directed out of the container 12 to the adhesive melter 16 at a location in the container 12 that is generally above where hot melt adhesive pieces 14 are moved in the recirculation conduit 40 from the bottom region 26 to the top region 42. Optionally, hot melt adhesive pieces 14 in the recirculation conduit 40 are diffused before or as they are introduced into the top region 42 of the container 12.

Agitation of hot melt adhesive pieces 14 in the system 10 can occur on any basis. For example, agitation can occur substantially continuously while hot melt adhesive pieces 14 are directed from the container 12 to the adhesive melter 16. Also, agitation can occur intermittently while hot melt adhesive pieces 14 are directed from the container 12 to the adhesive melter 16. Further still, agitation can occur when hot melt adhesive pieces 14 are not being directed from the container 12 to the adhesive melter 16, such as between dispensing operations.

Figure 3:
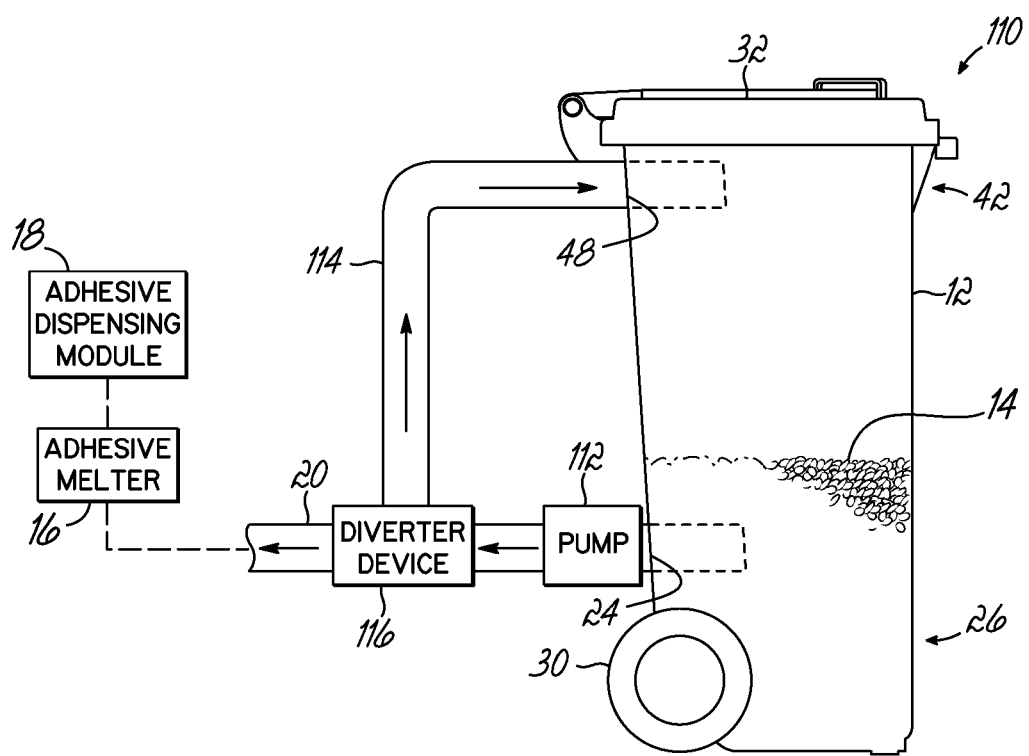
FIG. 3 is a schematic view depicting features of a hot melt adhesive supply system according another embodiment of the invention.

Referring next to FIG. 3, a hot melt adhesive supply system 110 is shown. The system 110 is generally similar to the system 10, with like reference numerals being used in the figure to indicate like features. Unlike the system 10, the system 110 includes a single pump 112 and a recirculation conduit 114 that extends between the transfer conduit 20 and the top region 42 of the container 12. The pump 112 is configured for both (1) moving hot melt adhesive pieces 14 in the transfer conduit 20 toward the hot melt adhesive melter 16, and (2) moving hot melt adhesive pieces from the transfer conduit 20 toward the top region 42 of the container 12 through the recirculation conduit 114. Thereby, the pump 112 is a common pump for moving the hot melt adhesive pieces 14 in both the transfer conduit 20 and the recirculation conduit 114.

In addition, the system 110 includes a diverter device 116 that connects the transfer conduit 20 and the recirculation conduit 114. The diverter device 116 is configured to adjustably control the amount of the hot melt adhesive pieces that is moved, or diverted, from the transfer conduit 20 into the recirculation conduit 114 and directed back into the container 12.

In use, the pump 112 pumps hot melt adhesive pieces 14 in the transfer conduit 20 and the recirculation conduit 114, and the diverter device 116 diverts an amount of hot melt adhesive pieces 14 in the transfer conduit 20 into the recirculation conduit 114.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A hot melt adhesive supply system, the system comprising:
    a container configured to receive a supply of unmelted hot melt adhesive pieces, the container having a first region, a second region, and at least one outlet,
    a recirculation device configured to move hot melt adhesive pieces from the first region of the container to the second region of the container,
    a recirculation conduit coupled with the recirculation device, the recirculation conduit extending between the first region and the second region for carrying the hot melt adhesive pieces from the first region to the second region,
    a transfer conduit configured to communicate hot melt adhesive pieces from the container to a hot melt adhesive melter, and
    the at least one outlet being configured to communicate hot melt adhesive pieces out of the container and into the transfer conduit and the recirculation conduit.

2. The hot melt adhesive supply system of claim 1, further comprising a first pump coupled with the transfer conduit and configured to move the hot melt adhesive pieces in the transfer conduit from the container toward the hot melt adhesive melter.

3. The hot melt adhesive supply system of claim 2, wherein the recirculation device further comprises a second pump coupled with the recirculation conduit and configured to move the hot melt adhesive pieces in the recirculation conduit from the first region to the second region.

4. The hot melt adhesive supply system of claim 1, wherein the first region is adjacent a bottom of the container and the second region is adjacent a top of the container.

5. The hot melt adhesive supply system of claim 1, wherein the at least one outlet includes a transfer outlet and a recirculation outlet, the transfer outlet being configured to communicate the hot melt adhesive pieces from the container to the transfer conduit and the recirculation outlet being configured to communicate the hot melt adhesive pieces from the container to the recirculation conduit, and wherein the transfer outlet is adjacent the recirculation outlet.

6. The hot melt adhesive supply system of claim 1, further comprising a diverter device connecting the recirculation conduit and the transfer conduit and being configured to adjustably control the amount of hot melt adhesive pieces diverted from the transfer conduit into the recirculation conduit.

7. A method for supplying unmelted hot melt adhesive pieces from a container having a first region and a second region to a melter for melting the hot melt adhesive pieces, the method comprising:
    moving the hot melt adhesive pieces from the first region of the container to the second region of the container through a recirculation conduit with a recirculation device, and
    directing the hot melt adhesive pieces from the container to the melter through a transfer conduit by pumping with a first pump.

8. The method of claim 7,
    wherein moving the hot melt adhesive pieces from the first region of the container to the second region of the container includes pumping with a second pump separate from the first pump.

9. The method of claim 8, further comprising diverting an amount of the hot melt adhesive pieces in the transfer conduit into the recirculation conduit.

10. The method of claim 7, wherein moving the hot melt adhesive pieces and directing the hot melt adhesive pieces include pumping with a common pump.

11. The method of claim 7, wherein directing hot melt adhesive pieces from the container to the melter occurs at a location in the container above moving hot melt adhesive pieces from the first region to the second region of the container.

12. The method of claim 7, further comprising diffusing the hot melt adhesive pieces pumped in the recirculation conduit and moved to the second region of the container.

13. A hot melt adhesive supply system, the system comprising:
    a container configured to receive a supply of unmelted hot melt adhesive pieces, the container having a first region and a second region;
    a recirculation device configured to move hot melt adhesive pieces from the first region of the container to the second region of the container;
    a recirculation conduit coupled with the recirculation device, the recirculation conduit extending between the first region and the second region for carrying the hot melt adhesive pieces from the first region to the second region;
    a transfer conduit configured to communicate hot melt adhesive pieces from the container to a hot melt adhesive melter;
    a transfer outlet configured to communicate hot melt adhesive pieces from the container to the transfer conduit; and
    a recirculation outlet generally adjacent the transfer outlet and configured to communicate hot melt adhesive pieces from the container to the recirculation conduit.

14. The hot melt adhesive supply system of claim 13, further comprising:
    a first pump coupled with the transfer conduit and configured for moving hot melt adhesive pieces in the transfer conduit from the container toward the hot melt adhesive melter; and
    a second pump coupled with the recirculation conduit for moving hot melt adhesive pieces in the recirculation conduit from the first region to the second region.

15. The hot melt adhesive supply system of claim 13, wherein the first region is adjacent a bottom of the container and the second region is adjacent a top of the container.

16. The hot melt adhesive supply system of claim 13, further comprising a diverter device connecting the recirculation conduit and the transfer conduit and being configured to adjustably control the amount of hot melt adhesive pieces diverted from the transfer conduit into the recirculation conduit.

17. A hot melt adhesive supply system, the system comprising:
- a container configured to receive a supply of unmelted hot melt adhesive pieces, the container having a first region and a second region;
- a recirculation device configured to move hot melt adhesive pieces from a first region of the container to a second region of the container;
- a recirculation conduit coupled with the recirculation device, the recirculation conduit extending between the first region and the second region for carrying the hot melt adhesive pieces from the first region to the second region;
- a transfer conduit configured to communicate hot melt adhesive pieces from the container to a hot melt adhesive melter;
- a first pump coupled with the transfer conduit and configured to move hot melt adhesive pieces in the transfer conduit from the container toward the hot melt adhesive melter; and
- a second pump coupled with the recirculation conduit for moving hot melt adhesive pieces in the recirculation conduit from the first region of the container to the second region of the container.

18. The hot melt adhesive supply system of claim 17, wherein the first region is adjacent a bottom of the container and the second region is adjacent a top of the container.

19. A method for supplying unmelted hot melt adhesive pieces from a container having a first region and a second region to a melter for melting the hot melt adhesive pieces, the method comprising:
- moving hot melt adhesive pieces from the first region of the container to the second region of the container through a recirculation conduit with a recirculation device, and
- directing hot melt adhesive pieces from the container to the melter at a location in the container above moving hot melt adhesive pieces from a first region of the container.

20. The method of claim 19, wherein:
- moving hot melt adhesive pieces from a first region of the container to a second region of the container includes pumping the hot melt adhesive pieces with a first pump, and
- directing hot melt adhesive pieces from the container to the melter includes pumping, with a second pump that is separate from the first pump, the hot melt adhesive pieces in a transfer conduit from the container to the melter.

* * * * *